United States Patent
Yamasaki

(10) Patent No.: US 8,442,114 B2
(45) Date of Patent: *May 14, 2013

(54) MOVING PICTURE ENCODING APPARATUS AND DISTRIBUTION SYSTEM

(75) Inventor: Takahiro Yamasaki, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 12/923,421

(22) Filed: Sep. 21, 2010

(65) Prior Publication Data

US 2011/0075733 A1 Mar. 31, 2011

(30) Foreign Application Priority Data

Sep. 30, 2009 (JP) ................................. 2009-227919

(51) Int. Cl.
*H04N 7/12* (2006.01)

(52) U.S. Cl.
USPC .................................................. 375/240.12

(58) Field of Classification Search ........................ None
See application file for complete search history.

(56) References Cited

U.S. PATENT DOCUMENTS

| 2004/0076332 | A1* | 4/2004 | Lin et al. ........................ 382/236 |
| 2006/0140269 | A1* | 6/2006 | Bruls ........................ 375/240.08 |
| 2008/0189073 | A1* | 8/2008 | Jagmohan et al. ............ 702/181 |

OTHER PUBLICATIONS

Anne Aaron, Shantanu Rane, Eric Setton, and Bernd Girod, "Transform-domain Wyner-Ziv Codec for Video." In: Proc, SPIE Visual Communications and Image Processing, San Jose, CA (2004).
C. Brites, F. Pereira, "Encoder Rate Control for Transform Domain Wyner-Ziv Video Coding", ICIP 2007, USA (Sep. 2007).

\* cited by examiner

*Primary Examiner* — Sath V Perungavoor
*Assistant Examiner* — Kate Luo
(74) *Attorney, Agent, or Firm* — Rabin & Berdo, P.C.

(57) ABSTRACT

A moving picture encoding apparatus divides a moving picture signal into key frames and non-key frames, encodes the key frames, predicts the non-key frames from the encoded key frames, determines a final encoding rate for each non-key frame, encodes each non-key frame, and outputs an error-correcting code at the final encoding rate as encoded data of the non-key frame. To determine the final encoding rate, the number of error-correcting bits needed to correct prediction errors is estimated by a first method and one or more second methods. The second methods are used to decide whether to use the number of bits estimated by the first method as the final encoding rate, or whether to supplement the estimated number of bits by adding an encoding rate correction. As a result, the encoding rate is not supplemented unnecessarily and the encoding efficiency is improved.

4 Claims, 10 Drawing Sheets

MOVING PICTURE ENCODING APPARATUS AND DISTRIBUTION SYSTEM

BACKGROUND OF THE INVENTION

1. Field of the Invention

The present invention relates to the encoding and decoding of moving picture sequences and is applicable in, for example, a system that uses distributed video coding techniques to distribute moving picture data.

2. Description of the Related Art

Distributed video coding (DVC) is a new coding method, based on the Slepian-Wolf and Wyner-Ziv theorems, that has attracted much recent attention. A basic DVC coding method is described by Aaron et al. in 'Transform-Domain Wyner-Ziv Codec for Video', *Proc. SPIE Visual Communications and Image Processing,* 2004. The encoder treats some frames in a received video sequence as key frames and the rest as Wyner-Ziv frames. The key frames are coded as intraframes. A discrete cosine transform (DCT) is used to transform each Wyner-Ziv frame to the coefficient domain, the coefficients are grouped into bands, the coefficients in the k-th band are quantized by a $2^{M_k}$-level quantizer, the quantized coefficients ($q_k$) are expressed in fixed numbers of bits, and the bit planes are extracted and supplied to a Slepian-Wolf encoder that uses a turbo code to produce data bits and error-correcting code bits, generally referred to as parity bits. The data bits are discarded.

The decoder decodes the key frames, uses the decoded key frames to generate a predicted image for each Wyner-Ziv frame, applies a DCT to convert the predicted image to the coefficient domain, groups the coefficients into bands, and inputs the coefficients in each band as side information to a Slepian-Wolf decoder. The Slepian-Wolf decoder uses parity bits received from the encoder to correct prediction errors in the side information by an iterative process, in which the decoder originally receives a subset of the parity bits and may request further parity bits as required. When a satisfactory decoded result is obtained, an inverse discrete cosine transform (IDCT) is applied to reconstruct the image of the Wyner-Ziv frame.

A problem with this method is that feedback from the decoder to the encoder is necessary in order to request additional parity bits. As a result, the encoder and decoder cannot operate independently, and there are inevitable delays involved with requesting and obtaining additional parity bits.

In 'Encoder Rate Control for Transform Domain Wyner-Ziv Video Coding', *ICIP* 2007, Brites et al. describe a DVC system that eliminates feedback. Instead, the encoder estimates the number of parity bits that the decoder will need for adequate decoding of each Wyner-Ziv frame by generating its own predicted image and comparing this predicted image with the original image. The encoder then sends the decoder the estimated number of parity bits without having to be asked for them. That is, the encoder controls its own encoding rate.

Brites et al. use a combination of two methods to estimate the necessary encoding rate. One method assumes that the distribution of the differences between the DCT coefficients of the original image and the predicted image can be approximately modeled by a Laplacian distribution. This model is used to estimate the decoder's prediction error probability. A conditional entropy is then calculated from the estimated error probability, and the necessary encoding rate is estimated from the conditional entropy.

Since the Laplacian model is only approximate, and since the encoder and decoder may generate somewhat different predicted images, the estimated necessary encoding rate will occasionally provide fewer parity bits than the decoder actually needs, causing the decoded image to be visibly distorted. Brites et al. therefore add a supplementary rate calculated from a relative error probability that indicates the probability of errors in new locations in bit planes. By adding the supplementary rate to the encoding rate estimated by the distribution model entropy method, they avoid sending the decoder data that it cannot decode.

A problem is that the supplementary rate is always added, even when it is not needed, so the encoder sometimes outputs more than the necessary number of parity bits. In that case, the supplementary parity bits do not improve the quality of the decoded image; the decoding result is the same as if the supplementary parity bits had not been sent. The only effect of the supplementary parity bits is to waste computational resources in the encoder and decoder and communication resources on the link between them.

This is a serious shortcoming in a video distribution system. It would be preferable if the encoder could tell when the supplementary parity bits were needed and send them only when necessary.

SUMMARY OF THE INVENTION

A general object of the present invention is to encode moving pictures more efficiently.

A more specific object is to determine when an encoder needs to supplement an estimated necessary encoding rate.

The invention provides a moving picture encoding apparatus for encoding a moving picture signal including a sequence of frames. In the moving picture encoding apparatus, a frame classifier designates each frame as a key frame or a non-key frame. A key frame encoder encodes the key frames. A side information generator uses the encoded key frame data to generate a predicted image for each non-key frame. An encoding rate estimator uses the predicted image to determine a final encoding rate for each non-key frame. A non-key frame encoder then encodes each non-key frame to obtain an error-correcting code at the final encoding rate determined by the encoding rate estimator, and outputs the error-correcting code as encoded data of the non-key frame.

The encoding rate estimator determines a first encoding rate by using a first method to estimate the number of error-correcting bits needed to correct prediction errors in the predicted image generated for the non-key frame, and estimates at least one second encoding rate by using a second method or methods different from the first method to re-estimate the necessary number of error-correcting bits. From the second encoding rate(s), the encoding rate estimator decides whether to supplement the first encoding rate. If the decision is not to supplement the first encoding rate, the first encoding rate is used as the final encoding rate. If the decision is to supplement the first encoding rate, the encoding rate estimator adds a calculated encoding rate correction to the first encoding rate.

The first encoding rate may be determined by a distribution model entropy calculation or a bit error entropy calculation.

The second encoding rate may be determined by a prediction entropy calculation based on a model of the relation of the predicted image to the non-key frame, or on a direct comparison of the predicted image with the non-key frame.

Calculating the second encoding rate enables the encoding efficiency to be improved by supplementing the first encoding rate only when necessary.

DETAILED DESCRIPTION OF THE INVENTION

Figure 1:
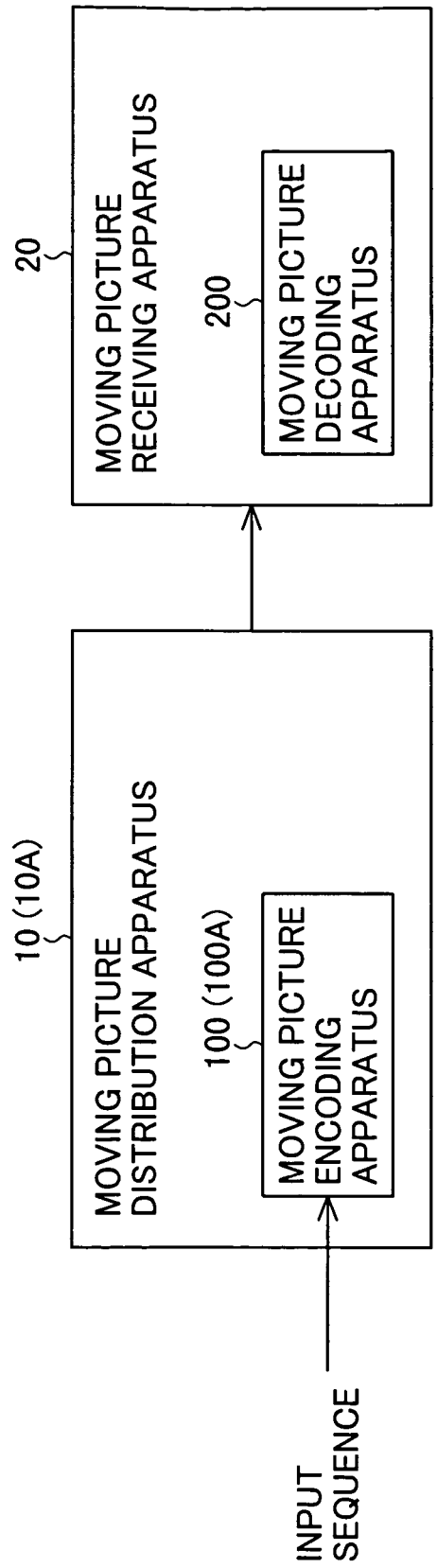
FIG. 1 is a block diagram illustrating the basic structure of a moving picture distribution system embodying the invention.

Two embodiments of the invention will now be described with reference to the attached drawings, in which like elements are indicated by like reference characters.

Both embodiments concern a moving picture distribution system 1 (1A) with the basic structure shown in FIG. 1, including a moving picture distribution apparatus 10 (10A) and a moving picture receiving apparatus 20. The moving picture distribution apparatus 10 includes a moving picture encoding apparatus 100 (100A) that encodes a video signal, and a transmitter (not shown) that transmits the encoded video signal to the moving picture receiving apparatus 20. The moving picture receiving apparatus 20 includes a moving picture decoding apparatus 200 that decodes the video signal, and other apparatus (not shown) for output of the decoded signal. The type of output is not limited. Exemplary forms of output include display, writing onto a storage medium, and transmission over a communication link. Reference characters 1A, 10A, and 100A are used in the second embodiment.

The video signal input to the moving picture encoding apparatus 100 may be any type of video signal, digital or analog, but it will be assumed in the following description that the signal is a digital signal organized as a sequence of frames. This is the type of signal that would be received from a video camera equipped with a charge coupled device (CCD) imager. If an analog video signal is input, the moving picture encoding apparatus 100 may include a frame grabber that captures the signal by converting it to a digitized frame sequence.

The moving picture encoding apparatus 100 may be a special-purpose device or it may be a general-purpose computer having, for example, a central processing unit (CPU), read only memory (ROM), random access memory (RAM), electrically programmable and erasable read only memory (EEPROM), a hard disk, and other well known facilities for storing data and storing and executing programs, including a program that implements the functions of the moving picture distribution apparatus 10 (or 10A) in the embodiments described below. The invention can be practiced by installing such a program in a computer. Other programs for communication processing, data processing, and so on may also be installed as necessary.

The moving picture decoding apparatus 200 may also be either a specialized device or a general-purpose computing device equipped with specialized software, and may include a display unit for displaying the decoded video signal output by the moving picture receiving apparatus 20, or a data storage unit for storing the decoded video signal output by the moving picture receiving apparatus 20.

A detailed description of the moving picture receiving apparatus 20 will be omitted. The moving picture decoding apparatus 200 may have, for example, the structure shown by Brites et al.

First Embodiment

Figure 2:
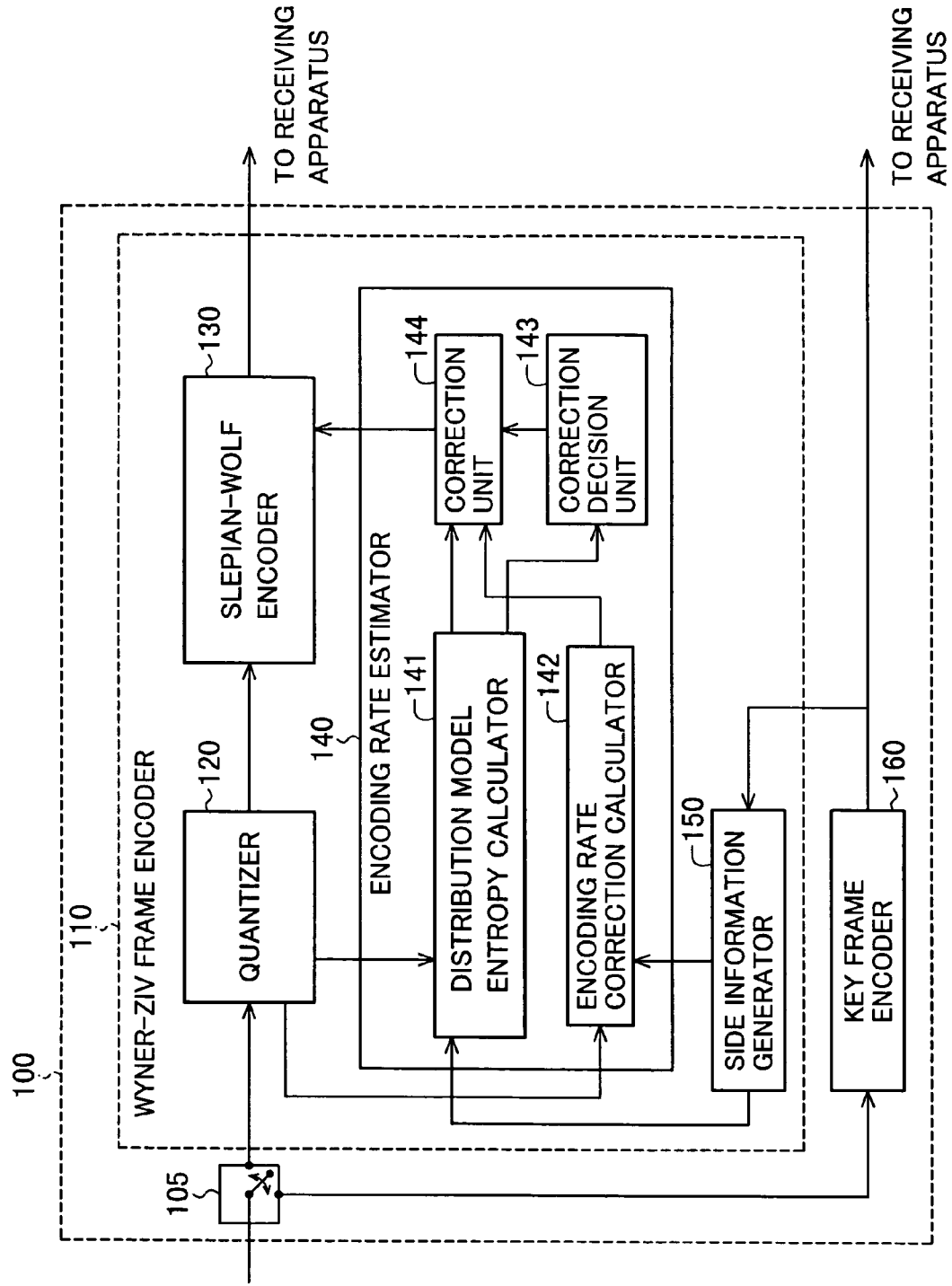
FIG. 2 is a functional block diagram illustrating the structure of a moving picture encoding apparatus in a first embodiment.

Referring to FIG. 2, the moving picture encoding apparatus 100 in the first embodiment comprises a frame classifier 105, a Wyner-Ziv frame encoder 110 and a key frame encoder 160. The frame classifier 105, shown schematically as a switch, receives the incoming frame sequence, designates each frame as a key frame or a non-key frame, sends the key frames to the key frame encoder 160, and sends the non-key frames to the Wyner-Ziv frame encoder 110. The Wyner-Ziv frame encoder 110 and key frame encoder 160 both output encoded data to the moving picture receiving apparatus 20 in FIG. 1. Non-key frames will be referred to below as Wyner-Ziv frames.

The frame classifier 105 may designate frames as key frames or Wyner-Ziv frames according to their position in the frame sequence. For example, odd-numbered frames may be key frames and even-numbered frames may be Wyner-Ziv frames. Alternatively, a scheme in which Wyner-Ziv frames occur consecutively, or key frames occur consecutively, may be used. The scheme may be selected for compatibility with existing DVC equipment.

The key frame encoder 160 receives and encodes the key frames and sends the encoded data to the moving picture receiving apparatus 20. Known intraframe coding methods such as the methods standardized by the Joint Photographic Experts Group (JPEG) or the Moving Picture Experts Group (MPEG) may be used, as taught by Aaron et al.

Distributed video coding of Wyner-Ziv frames may be carried out either in the pixel domain, by processing the pixel data directly, or in the transform domain, by first performing a transform such as a DCT, as also taught by Aaron et al. The moving picture encoding apparatus 100 will be described as operating in the transform domain, but the invention is not limited to either domain.

The Wyner-Ziv frame encoder 110 includes a quantizer 120, a Slepian-Wolf encoder 130, an encoding rate estimator 140, and a side information generator 150.

The quantizer 120 receives, transforms, and quantizes Wyner-Ziv frames, divides the quantized data into bit planes, and gives the bit planes to the Slepian-Wolf encoder 130 and encoding rate estimator 140.

The side information generator 150 generates a predicted image of a Wyner-Ziv frame from either or both of the key-frames preceding and following the Wyner-Ziv frame, transforms and quantizes the predicted image, and divides the quantized data into bit planes.

The encoding rate estimator 140 estimates an encoding rate that enables prediction errors in the input bit planes to be corrected, by using the original image of the input frame and the predicted image generated by the side information generator 150. Details will be given later.

The Slepian-Wolf encoder 130 receives quantized bit planes from the quantizer 120, performs Slepian-Wolf encoding of each bit plane by using a turbo code or a low-density parity-check (LDPC) code, for example, and sends resulting error-correcting code bits or parity bits to the moving picture receiving apparatus 20 at the encoding rate calculated by the encoding rate estimator 140. Instead of the term 'parity bits', the general term 'error-correcting code bits' will be used for uniformity below.

The encoding rate estimator 140 includes a distribution model entropy calculator 141, an encoding rate correction calculator 142, a correction decision unit 143, and a correction unit 144. The basic operation of each component of the encoding rate estimator 140 is described below. Further details will be given later.

The distribution model entropy calculator 141 obtains the bit planes of the transformed original image in the Wyner-Ziv frame from the quantizer 120 and the coefficients of the corresponding predicted image from the side information generator 150, estimates the error probability of each bit in the bit planes by using a distribution model, and then calculates an entropy.

The encoding rate correction calculator 142 obtains the bit planes of the transformed original image in the Wyner-Ziv frame from the quantizer 120 and the bit planes of the corresponding predicted image from the side information generator 150 and calculates an encoding rate correction.

The correction decision unit 143 compares the entropy obtained from the distribution model entropy calculator 141 and an entropy obtained by measuring bit differences (prediction errors) between the bit planes of the original image and the corresponding bit planes of the predicted image, and decides whether the encoding rate correction is needed.

The correction unit 144 corrects the calculation made by the distribution model entropy calculator 141 in accordance with the decision made by the correction decision unit 143 and supplies the corrected information to the Slepian-Wolf encoder 130 as the final encoding rate.

Figure 4:
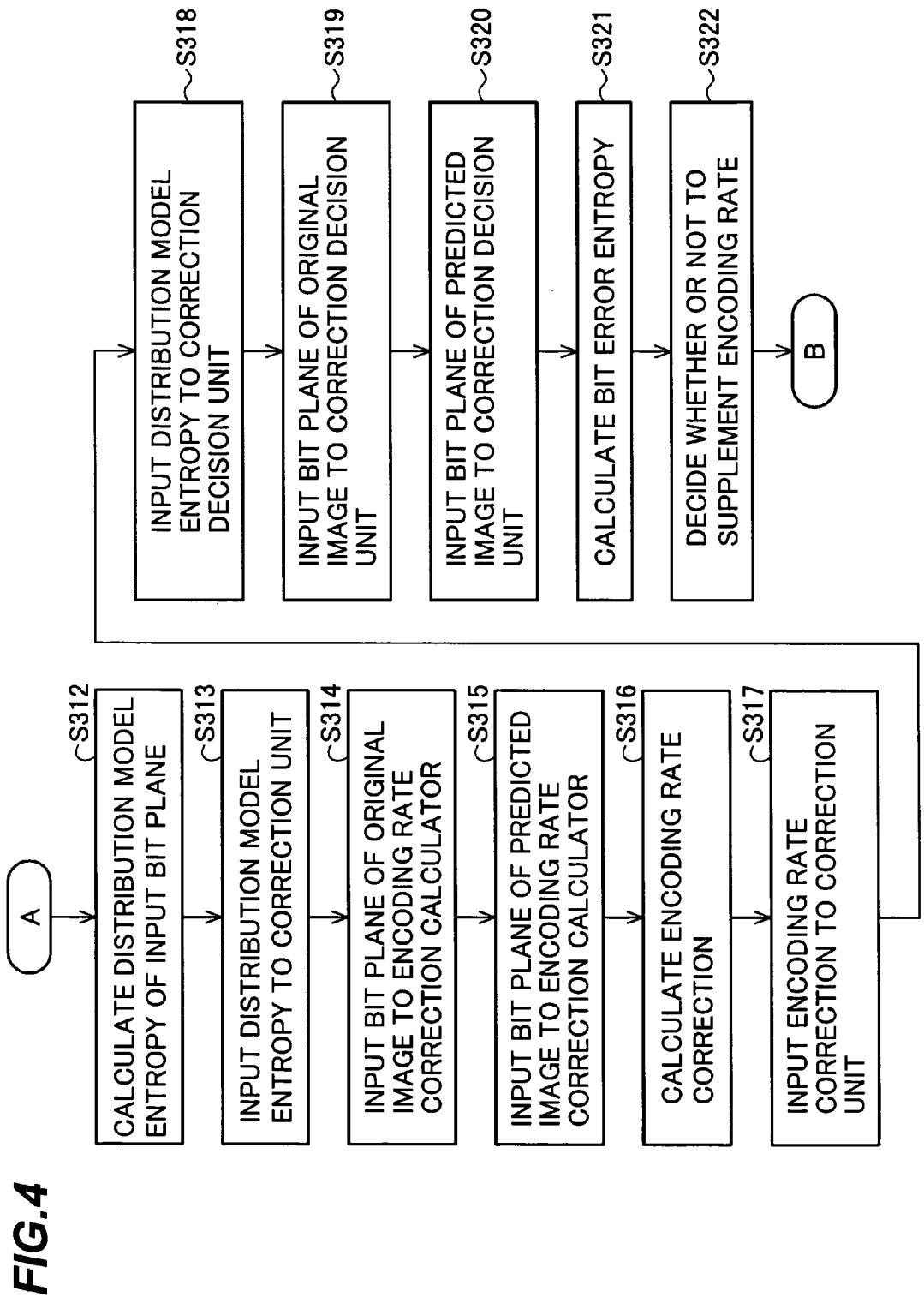
Figure 5:
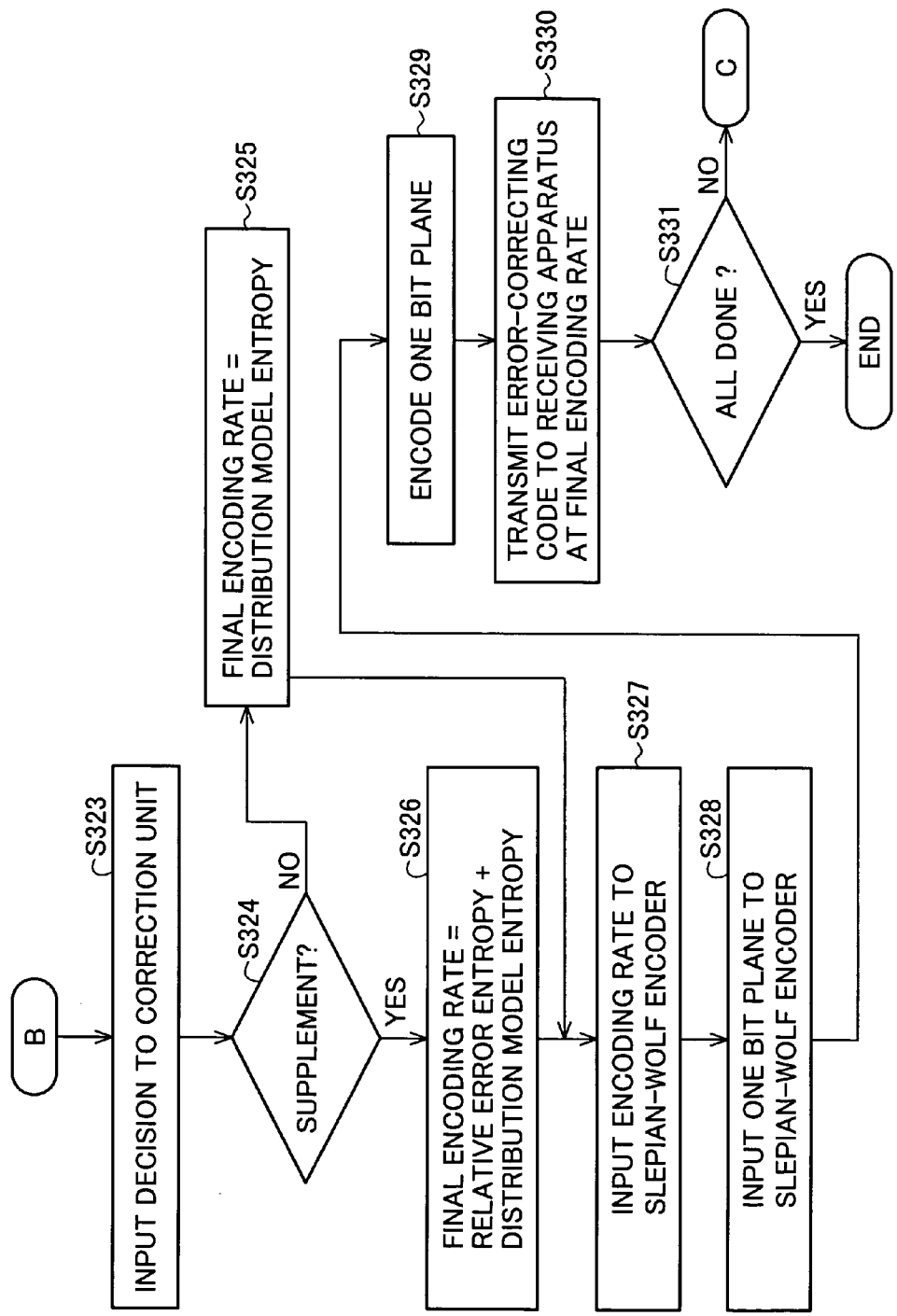

The encoding and decoding of Wyner-Ziv frames will now be described with reference to the flowchart in FIGS. 3 to 5. It will be assumed that the frame sequence consists of odd-numbered key frames, which are encoded by conventional methods, and even-numbered Wyner-Ziv frames, which are encoded as follows.

Figure 3:
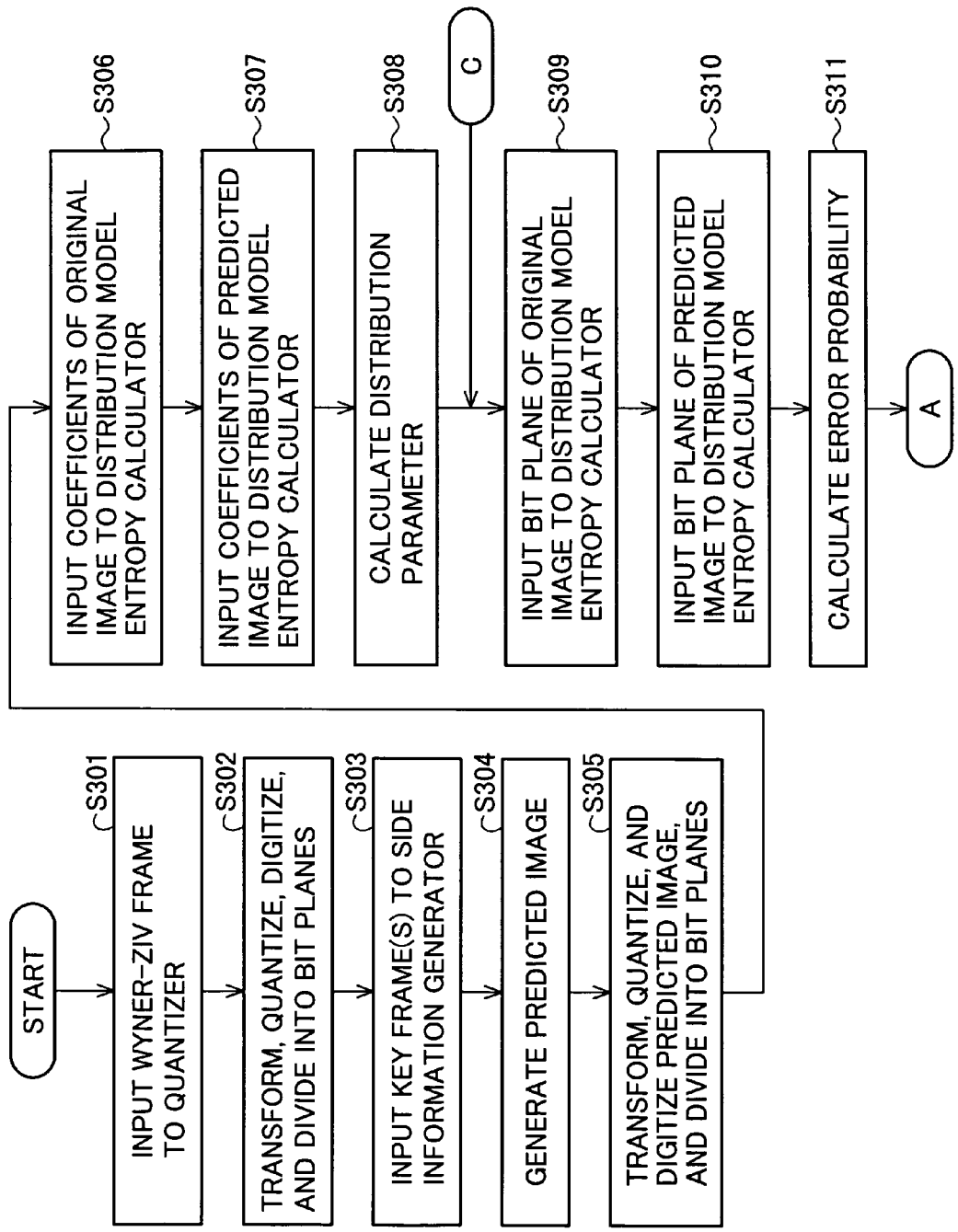
FIGS. 3 to 5 constitute a flowchart illustrating the operation of the moving image encoding apparatus in FIG. 2.

Referring to FIG. 3, when the encoding of a Wyner-Ziv frame such as the second frame begins, the frame is input to the quantizer 120 (step S301) and transformed to the coefficient domain by a DCT, and the coefficients are grouped into spatial frequency bands, quantized, and divided into bit planes (step S302). In each band, the bit planes may cover the entire area of the frame, or the frame area may be divided into sub-areas and the coefficient data corresponding to each sub-area may be divided into separate bit planes.

The image of either the preceding or following key frame or both is input from the key frame encoder 160 to the side information generator 150 (step S303) and a predicted image is generated for the Wyner-Ziv frame (step S304). The predicted image may be generated by using the preceding key frame image as the predicted image, by averaging the preceding and following key frame images, by carrying out a limited motion search, or by various other methods. The predicted image generated by the side information generator 150 is transformed and quantized, and the quantized data are divided into bit planes (step S305). The length of the bit planes in step S305 is the same as the length of the bit planes obtained by the quantizer 120.

The coefficients of the original image of the frame are input from the quantizer 120 to the distribution model entropy calculator 141 (step S306). In the next few steps, the distribution model entropy calculator 141 estimates the number of prediction errors on the assumption that the distribution of differences in coefficients between the original image and the predicted image can be approximately modeled by a Laplacian distribution, and calculates an entropy value.

First, the coefficients of the predicted image of the current frame are input from the side information generator 150 to the distribution model entropy calculator 141 (step S307).

The distribution model entropy calculator 141 calculates the parameter $\alpha$ of the Laplacian distribution for each band (step S308). The parameter $\alpha$ of the Laplacian distribution is related to the variance $\sigma^2$ of the distribution as in equation (1) below. If the mean value of the distribution is 0, the variance $\sigma^2$ can be calculated by equation (2) below, where X and Y represent coefficients derived from the original image and the predicted image, respectively, and N is the length of the bit plane.

$$\alpha^2 = \frac{2}{\sigma^2} \quad (1)$$

$$\sigma^2 = \frac{1}{N}\sum (X-Y)^2 - (\overline{X-Y})^2 = \frac{1}{N}\sum (X-Y)^2 \quad (2)$$

A bit plane of the original image is now input from the quantizer 120 to the distribution model entropy calculator 141 (step S309). The corresponding bit plane of the predicted image is input from the side information generator 150 to the distribution model entropy calculator 141 (step S310). The distribution model entropy calculator 141 calculates an error probability by using the distribution model as follows (step S311).

If X is a random variable representing a coefficient of the original image and Y is a random variable representing the corresponding coefficient of the predicted image, the conditional probability distribution of X for a given value of Y can be represented by equation (3). The probability $P_n$ that the nth bit $x''_j$ in the jth bit plane in the original image has the value '1' can be expressed in terms of conditional probabilities as in equation (4), where $x''_{j-1}$ is the corresponding bit in the preceding (j−1)th bit plane of the original image and $y''_j$ is the corresponding bit in the jth bit plane of the predicted image. The (j−1)th bit plane is more significant than the jth bit plane, and will normally have been processed before the jth bit plane is processed.

$$P(X \mid Y) = \frac{\alpha}{2}\exp(-\alpha|Y-X|) \quad (3)$$

$$P_n = \frac{P(X_j = 1, \ X_{j-1} = x^n_{j-1} \mid Y = y_n)}{p(X_j = x^n_j \mid Y_j = y^n_j)} \quad (4)$$

Since the entropy calculation that follows is symmetrical with respect to $P_n$ and $1-P_n$ and gives the amount of information needed to correct errors, the value of $P_n$ can be considered as representing an error probability.

From the error probability $P_n$, the distribution model entropy calculator 141 calculates the entropy $H(P_n)$ given by the equation (5) below (step S312 in FIG. 4).

$$H(P_n) = -P_n \log(P_n) - (1-P_n)\log(1-P_n) \quad (5)$$

The entropy expressed by equation (5) represents the amount of information needed to correct an error in the nth bit in the jth bit plane. If the same calculation is carried out for each bit in the jth bit plane and the results are averaged, the conditional entropy $H_{X|Y}$ given by equation (6) below is obtained, representing the amount of information needed to correct errors in the entire jth bit plane. This entropy value will be referred to as the distribution model entropy. This value also represents the first encoding rate calculated by the encoding rate estimator 140.

$$H_{X|Y} = \frac{1}{N} \sum H(P_n) \qquad (6)$$

The distribution model entropy calculated by the distribution model entropy calculator 141 is input to the correction unit 144 (step S313).

In the next few steps an encoding rate correction is prepared for use if the first encoding rate is not adequate for decoding. The relative error entropy described by Brites et al. will be used as an exemplary encoding rate correction.

To calculate the relative error entropy, the bit plane of the original image is input from the quantizer 120 to the encoding rate correction calculator 142 (step S314); the corresponding bit plane of the predicted image is input from the side information generator 150 to the encoding rate correction calculator 142 (step S315); the encoding rate correction calculator 142 compares the two input bit planes and calculates a relative error probability (step S316). The relative error probability can be obtained by dividing the number of bits that differ from the corresponding predicted bits in the current bit plane but not in higher bit planes by the length of the bit plane. The relative error entropy is then calculated from the relative error probability as shown by Brites et al. to obtain the encoding rate correction.

The encoding rate correction obtained by the encoding rate correction calculator 142 is input to the correction unit 144 (step S317), where it is treated as a supplementary encoding rate. To decide whether to apply the encoding rate correction, the correction decision unit 143 compares the distribution model entropy with, for example, a bit error entropy calculated as follows.

The distribution model entropy $H_{X|Y}$ is input from the distribution model entropy calculator 141 to the correction decision unit 143 (step S318). The corresponding bit plane of the original image is input from the quantizer 120 to the correction decision unit 143 (step S319). The corresponding bit plane of the predicted image is input from the side information generator 150 to the correction decision unit 143 (step S320).

By comparing the corresponding bit planes the original and predicted images, the correction decision unit 143 obtains an error count e. Dividing the error count e by the bit plane length N gives a bit error rate err (err=e/N) (step S321). The bit error entropy H(err) is calculated from the bit error rate as in equation (7) below. The encoding rate represented by the bit error entropy will be referred to as the second encoding rate.

$$H(err) = -err \log(err) - (1-err)\log(1-err) \qquad (7)$$

The correction decision unit 143 now compares the first and second encoding rates, that is, the bit error entropy H(err) and the distribution model entropy $H_{X|Y}$, to decide whether or not to supplement the first encoding rate (step S322).

The first encoding rate or distribution model entropy is based on an assumed general model, while the second encoding rate or bit error entropy is based on an actual comparison of the original and predicted images. If the first encoding rate is equal to or greater than the second encoding rate, it can be inferred that the first encoding rate is sufficient to enable the decoding apparatus to correct the errors that will actually occur in the predicted image generated at the decoding apparatus, and the correction decision unit 143 decides to use the first encoding rate as the final coding rate. If the second encoding rate exceeds the first encoding rate, it can be inferred that the first encoding rate may be inadequate, so the correction decision unit 143 decides to supplement the first coding rate.

The decision made by the correction decision unit 143 is input to the correction unit 144 (step S323 in FIG. 5) and tested (step S324). If the correction decision unit 143 has decided not to supplement the first coding rate, the first encoding rate becomes the final coding rate output by the encoding rate estimator 140 (step S325). Otherwise, the correction unit 144 supplements the first coding rate by adding the encoding rate correction, that is, by adding the relative error entropy to the distribution model entropy, to obtain the final encoding rate (step S326).

The correction unit 144 supplies the final encoding rate to the Wyner-Ziv frame encoder 110 (step S327). The bit plane to be encoded is now input from the quantizer 120 to the Slepian-Wolf encoder 130 (step S328) and encoded (step S329), and the Slepian-Wolf encoder 130 outputs an error-correcting code at the final encoding rate determined by the encoding rate estimator 140 (step S330).

The Wyner-Ziv frame encoder 110 now decides whether all bit planes of the current frame have been processed (step S331). If so, the processing of the frame ends. Otherwise, the Wyner-Ziv frame encoder 110 returns to step S309 to process the next bit plane.

In contrast to the prior art, the Wyner-Ziv frame encoder 110 in the first embodiment does not always add a correction to the first encoding rate obtained from the distribution model. A second coding rate is calculated by a different method (e.g., bit error entropy), the first and second encoding rates are compared, and the first encoding rate is corrected, by adding a supplementary encoding rate, only if the comparison indicates a correction to be necessary. The Wyner-Ziv frame encoder is thereby able to avoid sending the moving picture decoding apparatus 200 an unnecessarily large amount of encoded data. The first embodiment accordingly saves time, and conserves computational resources and communication resources.

Second Embodiment

Figure 6:
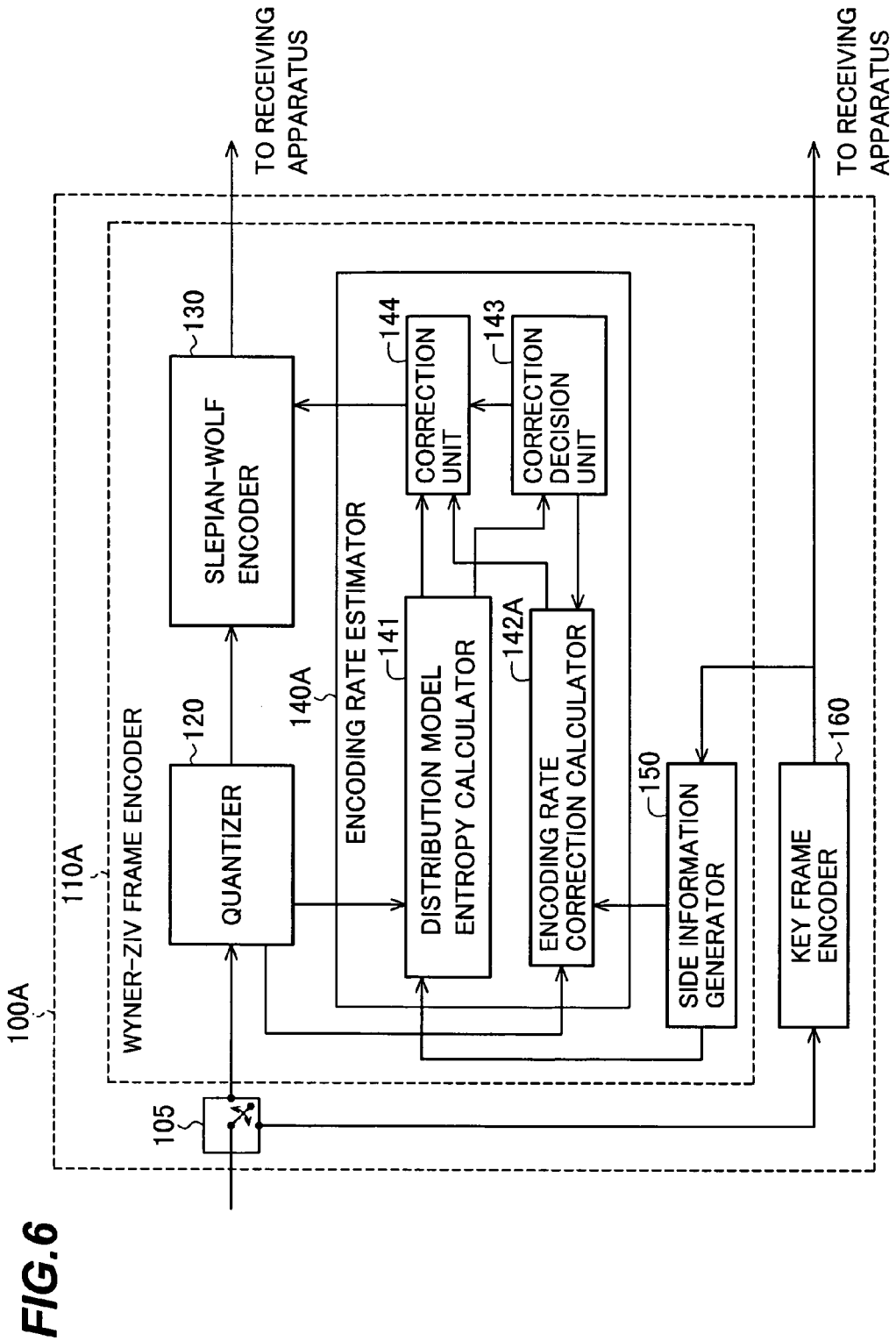
FIG. 6 is a functional block diagram illustrating the structure of a moving picture encoding apparatus in a second embodiment.
Figure 7:
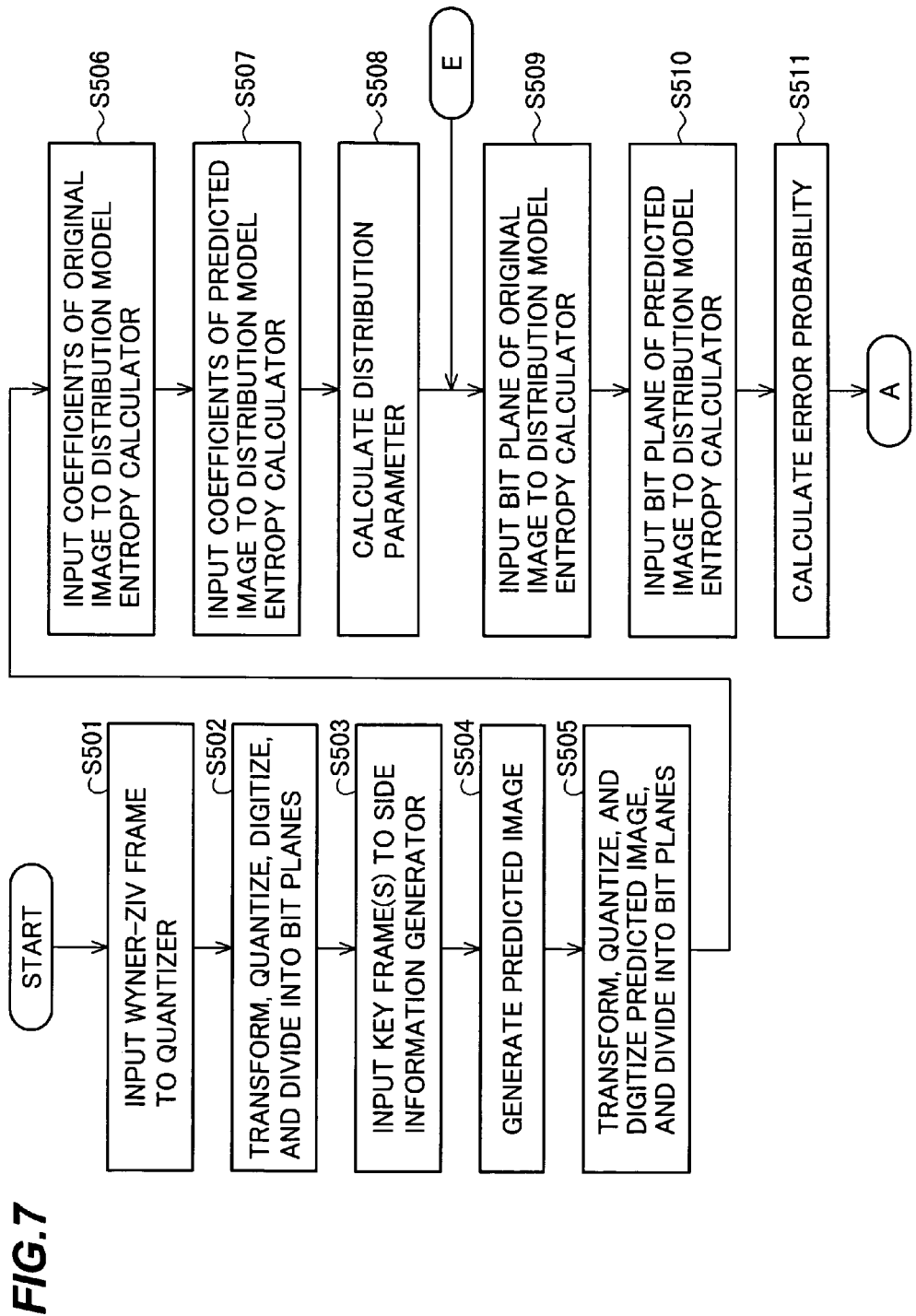
FIGS. 7 to 10 constitute a flowchart illustrating the operation of the moving picture encoding apparatus in FIG. 6.

Referring again to FIG. 1, the moving picture distribution system 1A in the second embodiment has the same moving picture receiving apparatus 20 as in the first embodiment, but the moving picture distribution apparatus 10A includes a different moving picture encoding apparatus 100A. Referring to FIG. 6, the moving picture encoding apparatus 100A includes the same frame classifier 105 and key frame encoder 160 as in the first embodiment, but has a Wyner-Ziv frame encoder 110A including an encoding rate estimator 140A with an encoding rate correction calculator 142A that operates only when the correction decision unit 143 decides to supplement the encoding rate. The other components of the encoding rate estimator 140A operate as in the first embodiment.

The operation of the second embodiment will now be described with reference to the flowcharts in FIGS. 7 to 10. It will again be assumed that the frame sequence consists of odd-numbered key frames, which are encoded by conventional methods, and even-numbered Wyner-Ziv frames, which are encoded as follows.

The encoding rate correction calculated by the encoding rate correction calculator 142A in the second embodiment is the relative error entropy indicated by Brites et al., as in the first embodiment.

The quantizer 120 transforms and quantizes each input Wyner-Ziv frame and divides the quantized data into bit planes; the side information generator 150 generates a predicted image; and the distribution model entropy calculator 141 calculates a distribution model entropy (steps S501 to S513). The same operations are performed in steps S501 to S513 as in steps S301 to S313 in the first embodiment, so descriptions will be omitted.

In the next few steps, the correction decision unit 143 decides whether the first encoding rate obtained by the distribution model entropy calculator 141 needs to be supplemented. This decision is made by, for example, comparing the distribution model entropy with a bit error entropy, as in the first embodiment: the distribution model entropy is input from the distribution model entropy calculator 141 to the correction decision unit 143 (step S514 in FIG. 8); one bit plane of the original image is input from the quantizer 120 to the correction decision unit 143 (step S515); the corresponding bit plane of the predicted image is input from the side information generator 150 to the correction decision unit 143 (step S516); the bit planes of the original image and the predicted image are compared, the number of bit errors is counted, and a bit error entropy is calculated (step S517); the correction decision unit 143 compares the bit error entropy and the distribution model entropy and decides whether to supplement the encoding rate obtained from the distribution model entropy (step S518); the decision made by the correction decision unit 143 is input to the correction unit 144 (step S519) and tested (step S520).

Figure 9:
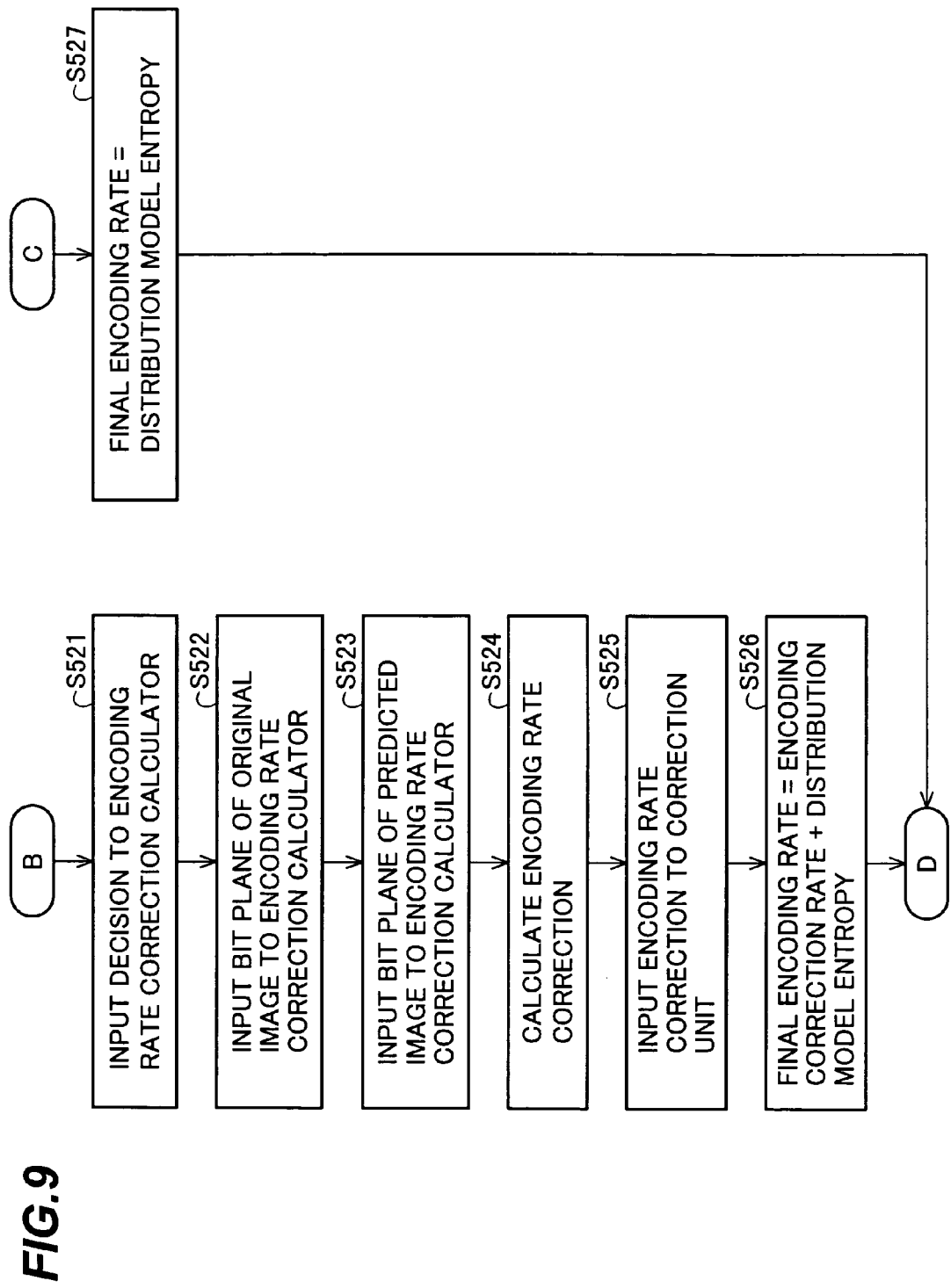
Figure 10:
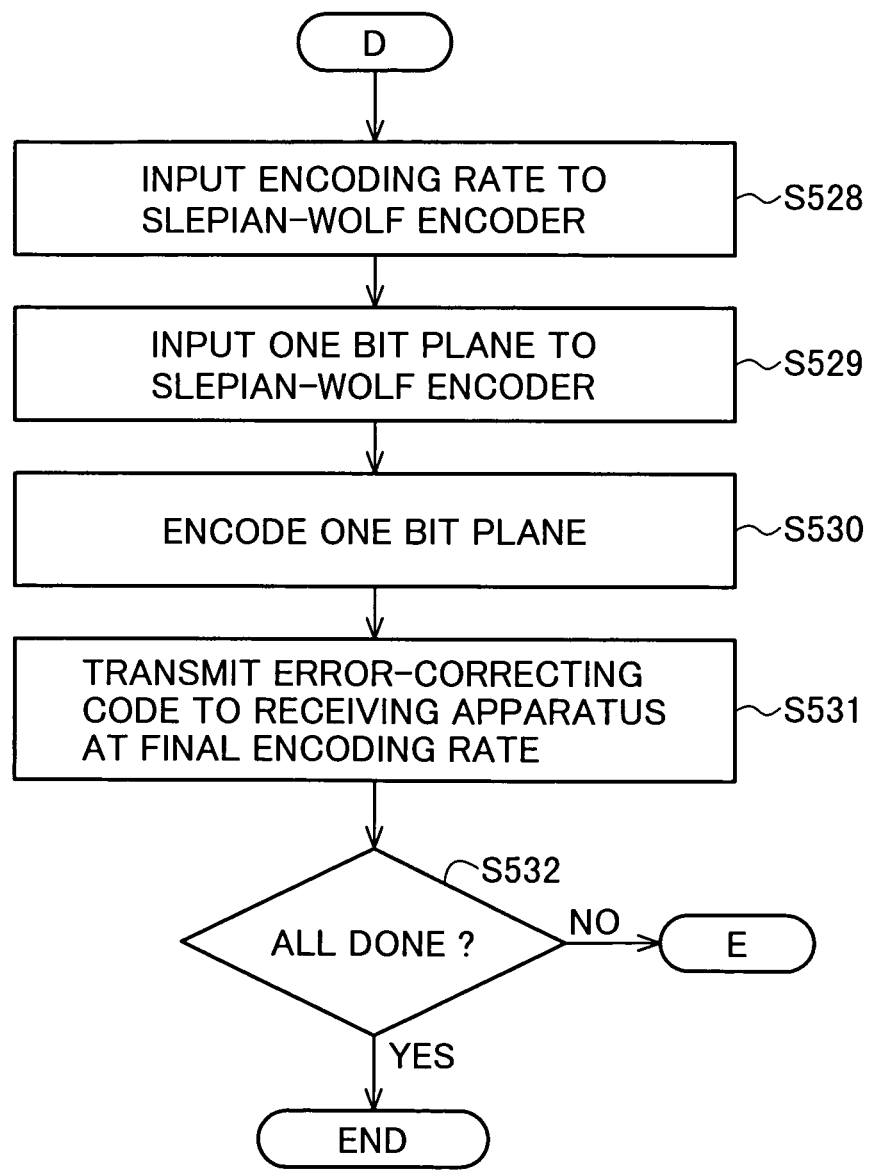

If the correction decision unit 143 decides to supplement the first encoding rate, it also passes this decision to the encoding rate correction calculator 142A (step S521 in FIG. 9). The encoding rate correction calculator 142A then obtains the bit plane of the original image from the quantizer 120 (step S522) and the corresponding bit plane of the predicted image from the side information generator 150 (step S523), compares these two bit planes, calculates a relative error probability, and derives an encoding rate correction (step S524), which is provided to the correction unit 144 (step S525). The correction unit 144 adds the encoding rate correction to the encoding rate calculated from the distribution model entropy (step S526). The resulting sum is the final encoding rate output by the encoding rate estimator 140A.

Figure 8:
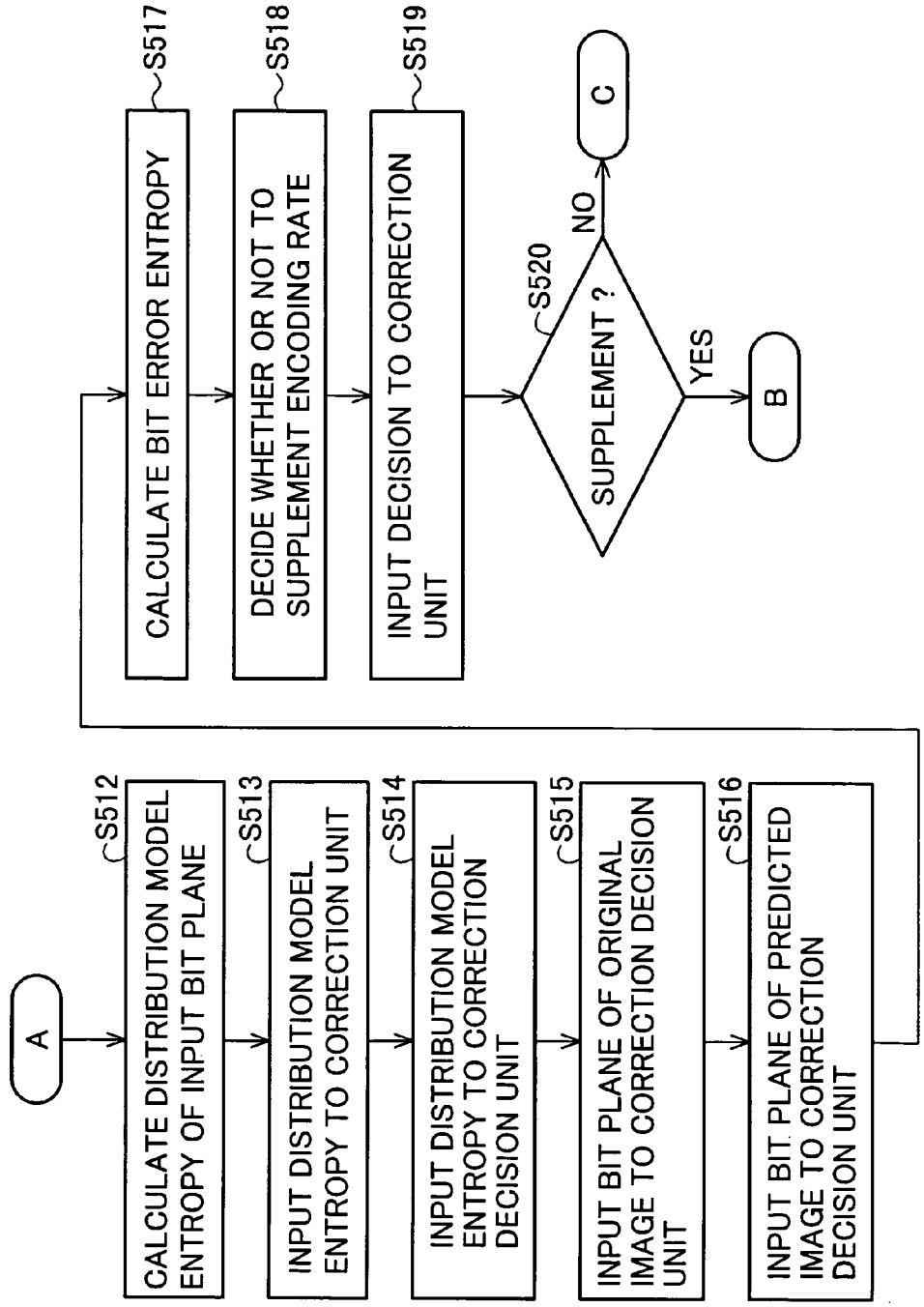

If the correction unit 144 finds in step S520 in FIG. 8 that the correction decision unit 143 has decided not to supplement the first encoding rate, the correction unit 144 uses the first encoding rate, i.e., the distribution model entropy calculated by the distribution model entropy calculator 141, as the final encoding rate (step S527 in FIG. 9).

Following step S526 or S527, the final encoding rate is input to the Slepian-Wolf encoder 130 (step S528 in FIG. 10), the bit plane to be encoded is input from the quantizer 120 to the Slepian-Wolf encoder 130 (step S529) and encoded (step S530), and the resulting error-correcting code is output at the final encoding rate obtained by the encoding rate estimator 140A and transmitted to the moving picture decoding apparatus 200 (step S531).

The Wyner-Ziv frame encoder 110A then determines whether all bit planes of the current frame have been processed (step S532). If so, the processing of the frame ends. Otherwise, the processing returns to step S509.

The effect of the second embodiment is to reduce the amount of encoding processing, because the encoding rate correction calculator 142A calculates the encoding rate correction only when the correction decision unit 143 decides that the encoding rate correction is necessary.

The present invention is not limited to the embodiments described above. The following are some of the possible modifications.

In FIG. 1, the moving picture encoding apparatus is shown as part of a moving picture distribution apparatus. The moving picture encoding apparatus may, however, be a stand-alone apparatus for the output of encoded data generated from an input sequence of frames. The output may take the form of storing the data in a disk drive or other storage medium, or outputting the data to another apparatus.

The second encoding rate estimate obtained by the encoding rate estimator need not be calculated by the bit error entropy method; it may be calculated by any method differing from the distribution model entropy method used to calculate the first encoding rate estimate. Alternatively, the encoding rate estimator may calculate a plurality of second encoding rates by different methods, compare them with the first encoding rate calculated by the distribution model entropy method, and then decide whether to supplement the first encoding rate. For example, the encoding rate estimator 140 may be decide to supplement the first encoding rate if at least one of the second encoding rates exceeds the first encoding rate.

In another variation, the bit error entropy method is used to calculate the first encoding rate, and the distribution model entropy method is used to calculate the second encoding rate.

Those skilled in the art will recognize that further variations are possible within the scope of the invention, which is defined in the appended claims.

What is claimed is:

1. A moving picture encoding apparatus for encoding a moving picture signal including a sequence of frames, the moving picture encoding apparatus comprising:
a frame classifier for designating each frame in the sequence as a key frame or a non-key frame;
a key frame encoder for encoding the designated key frames in the sequence to generate encoded key frame data;
a side information generator for using the encoded key frame data to generate a predicted image for each designated non-key frame in the sequence;
an encoding rate estimator for determining a final encoding rate for said each designated non-key frame by estimating a number of error-correcting bits needed to correct prediction errors in the predicted image generated for said each designated non-key frame; and
a non-key frame encoder for encoding said each designated non-key frame to obtain an error-correcting code at the final encoding rate determined by the encoding rate estimator, and outputting the error-correcting code as encoded data of said each designated non-key frame;
wherein the encoding rate estimator includes
a first encoding rate calculator configured to use a model that approximates a relation between said each designated non-key frame and the predicted image to calculate a distribution model entropy, and to calculate a first encoding rate using the distribution model entropy, the distribution model entropy corresponding to a first prediction error rate of the predicted image with respect to said each designated non-key frame,
an encoding rate correction calculator configured to compare a bit plane in said each designated non-key frame with a corresponding bit plane in the predicted image, and to calculate a relative error probability, to thereby determine an encoding rate correction,
a second encoding rate calculator configured to compare said each designated non-key frame with the predicted image to determine a difference therebetween, to calculate a bit error entropy using the difference, and to calculate a second encoding rate using the bit error entropy, the bit error entropy corresponding to a second prediction error rate of the predicted image with respect to said each designated non-key frame, a correction decision unit configured to compare the distribution model entropy and the bit error entropy, and to decide whether or not to supplement the first encoding rate, the correction decision unit deciding to supplement the first encoding rate when the bit error entropy is larger than the distribution model entropy, and a correction unit configured to use the first encoding rate as the final encoding rate when the correction decision unit decides not to supplement the first encoding rate, and to use a supplemented first encoding rate, obtained by adding the encoding rate correction to the first encoding rate, as the final coding rate when the correction decision unit decides to supplement the first encoding rate.

2. The moving picture encoding apparatus of claim 1, wherein the encoding rate correction calculator determines the encoding rate correction only when the correction decision unit decides to supplement the first encoding rate.

3. A machine-readable non-transitory medium storing a program executable by a computing device to encode a moving picture signal including a sequence of frames, the program including instructions for:

designating each frame in the sequence as a key frame or a non-key frame;

encoding the designated key frames in the sequence to generate encoded key frame data;

using the encoded key frame data to generate a predicted image for each designated non-key frame in the sequence;

calculating a distribution model entropy using a model that approximates a relation between said each designated non-key frame and the predicted image, and calculating a first encoding rate using the distribution model entropy, the distribution model entropy corresponding to a first prediction error rate of the predicted image with respect to said each designated non-key frame;

comparing said each designated non-key frame with the predicted image to determine a difference therebetween, calculating a bit error entropy using the difference, and calculating a second encoding rate using the bit error entropy, the bit error entropy corresponding to a second prediction error rate of the predicted image with respect to said each designated non-key frame;

comparing the distribution model entropy and the bit error entropy, and making a decision as to whether to supplement the first encoding rate, said making a decision including deciding to supplement the first encoding rate when the bit error entropy is larger than the distribution model entropy;

comparing a bit plane in said each designated non-key frame with a corresponding bit plane in the predicted image, and calculating a relative error probability, to thereby determine an encoding rate correction;

using the first encoding rate as a final encoding rate when the decision is not to supplement the first encoding rate, and using a supplemented first encoding rate, obtained by adding the encoding rate correction to the first encoding rate, as the final coding rate when the decision is to supplement the first encoding rate; and encoding said each designated non-key frame to obtain an error-correcting code at the final encoding rate, and outputting the error-correcting code as encoded data of said each designated non-key frame.

4. A moving picture distribution system comprising:

a moving picture distribution apparatus including the moving picture encoding apparatus of claim 1; and a moving picture receiving apparatus including a moving picture decoding apparatus for receiving the encoded key frame data and the encoded data of said each designated non-key frame and decoding the encoded key frame data and the encoded data of said each designated non-key frame.

* * * * *